United States Patent
Huang et al.

(10) Patent No.: US 8,599,581 B2
(45) Date of Patent: Dec. 3, 2013

(54) PRIMARY-SIDE REGULATED MODULATION CONTROLLER WITH IMPROVED TRANSIENT RESPONSE AND AUDILE NOISE

(75) Inventors: Yuquan Huang, Shenzhen (CN); Matthew Man Ho Ku, Pleasanton, CA (US)

(73) Assignee: Fremont Micro Devices (SZ) Limited, Shenzhen (CN)

( * ) Notice: Subject to any disclaimer, the term of this patent is extended or adjusted under 35 U.S.C. 154(b) by 126 days.

(21) Appl. No.: 13/398,832

(22) Filed: Feb. 16, 2012

(65) Prior Publication Data
US 2013/0215649 A1    Aug. 22, 2013

(51) Int. Cl.
*H02M 3/335* (2006.01)
(52) U.S. Cl.
USPC .................. 363/21.12; 363/21.16; 363/21.17; 363/21.18
(58) Field of Classification Search
USPC ......... 363/21.12, 21.16, 21.17, 21.18, 95, 97, 363/131
See application file for complete search history.

(56) References Cited

U.S. PATENT DOCUMENTS

| | | | | |
|---|---|---|---|---|
| 7,433,211 B1* | 10/2008 | Collmeyer et al. | ......... | 363/21.13 |
| 7,492,615 B2* | 2/2009 | Morota et al. | ............. | 363/21.16 |
| 8,199,537 B2* | 6/2012 | Yan et al. | ................... | 363/21.12 |
| 8,199,539 B2* | 6/2012 | Wang et al. | ................ | 363/21.18 |
| 2007/0253228 A1* | 11/2007 | Morota et al. | ............. | 363/21.12 |
| 2008/0112193 A1* | 5/2008 | Yan et al. | ................... | 363/21.08 |
| 2010/0195355 A1* | 8/2010 | Zheng | ......................... | 363/21.12 |
| 2010/0208500 A1* | 8/2010 | Yan et al. | ................... | 363/21.12 |
| 2011/0194316 A1* | 8/2011 | Morota | ...................... | 363/21.17 |
| 2011/0286248 A1* | 11/2011 | Wang et al. | ................ | 363/21.18 |
| 2013/0051089 A1* | 2/2013 | Pan et al. | .................. | 363/21.17 |

* cited by examiner

*Primary Examiner* — Bao Q Vu

(57) ABSTRACT

A switching mode power supply, and a primary-side controlled PFM converter using the primary-side regulated PFM controller are discussed. In present embodiment, the primary side cycle by cycle switch peak current is no longer a constant. The time detector is added to monitor the waveform of primary-side sample voltage and then generate the duty cycle. The transfer function should be selected to satisfy a specific relationship of switching frequency and switch peak current against with output loading current. The new design shows higher switching frequency but lower value of switch peak current at light load condition. This resolves the audible noise and poor transient response issue from the prior art PFM controller.

20 Claims, 8 Drawing Sheets

PRIMARY-SIDE REGULATED MODULATION CONTROLLER WITH IMPROVED TRANSIENT RESPONSE AND AUDILE NOISE

FIELD OF THE INVENTION

The present invention relates to a switching mode power supply, and more particularly relates to a primary-side regulated pulse frequency modulation (PFM) controller of a switching mode power supply, and a primary-side controlled PFM converter using the primary-side regulated PFM controller.

BACKGROUND OF THE INVENTION

With the aggressive growth of battery powered portable electronics (e.g., cell phones), the demand for low cost and better efficiency battery chargers is extremely high. Flyback converter is the first choice among different switching mode topologies to meet this demand due to its simplicity. Over the years, various primary-side regulated Pulse Width Modulation (PWM) or Pulse Frequency Modulation controller integrated circuit chips have been developed and used to build constant voltage Flyback power supplies.

FIG. 1A shows a block diagram of an exemplary prior-art primary-side controlled PFM converter. Such a primary-side controlled PFM converter typically comprises a full bridge rectifier 107, a transformer T1 (including three windings: primary winding 101, secondary winding 102 and auxiliary winding 103), a primary switch 105, a primary-side regulated PFM controller 100, an auxiliary power supply network 108, a secondary rectifier D1 and an output capacitor C1. A resistor 109 and a capacitor C2 provide the initial start-up energy for the primary-side regulated PFM controller 100. Once the primary-side controlled PFM converter is stable, primary-side regulated PFM controller 100 is powered by the auxiliary power network 108. The output voltage is fed back to the primary winding 101 via the auxiliary winding 103 and sensed by voltage divider resistor R2 and R3. A resistor $R_{cs}$ senses the current flowing through primary switch 105. The primary switch peak current $I_{pkp}$ against with output loading is a constant and its characteristic curve I1 is depicted in FIG. 10.

A functional block diagram of the primary-side regulated PFM controller is shown in FIG. 1B. It consists of a current sense comparator 111, a feedback error amplifier 112, constant voltage (CV) control module 113 and PFM control module 115. Voltage at CS node which represents the current magnitude of primary winding 101 is coupled to the positive input of the CS comparator 111 and compared with an internal reference voltage $V_{CS0}$. The CS comparator 111 becomes high while the CS node voltage reaches the reference voltage $V_{CS0}$ to turn off the primary switch 105. During the off time, the feedback error amplifier module 112 samples the $V_{FB}$ voltage signal through the resistor divider networks R2 and R3. The result of the error amplifier 112 is coupled to the CV control module 113 which is used for setting primary switch 105 off time. A negative feedback control loop is formed by auxiliary winding with secondary to auxiliary winding ratio $N_{SA}$, divider network $R_2$ and $R_3$, error amplifier 112, CV control module 113, PFM control module 115 and primary switch 105 which sets the output voltage defined by equation (1);

$$V_o = V_{REF0}\frac{N_{SA} \times (R_2 + R_3)}{R_3} - V_{D1} \qquad (1)$$

FIG. 2 illustrates the operation principle of the prior-art primary-side controlled PFM converter shown in FIG. 1A. Waveform "OUT" shown in FIG. 2 is the output control signal 106 from the primary-side regulated PFM controller 100 shown at FIG. 1. This output control signal 106 drives the primary switch 105 on and off. During the on time, the primary winding current $I_p$ is increasing with time at a positive slope which is defined by Vin/$L_P$. Energy is then stored in the primary side inductor with inductance value $L_P$ of the transformer T1 but not transferred to the output loading. While the primary winding current $I_p$ hits a reference value $I_{pkp}$ which is defined by $V_{CS0}/R_{CS}$, the output of the CS comparator 111 turns high that instructs PFM control module 115 to turn off the primary switch 105. Once the primary switch 105 is off, the secondary rectifier D1 becomes forward bias and a secondary current $I_S$ starting with peak value $I_{pks}$ flows through the secondary rectifier D1. $I_S$ is decreasing with time duration $T_{ons}$ at a negative slope $V_S/L_S$ where $L_S$ is the inductance of secondary side. By considering the $I_s$ waveform shown in FIG. 2, load output current $I_o$ can be expressed as:

$$I_o = \frac{1}{2}I_{pks}\frac{T_{ons}}{T} = \frac{1}{2}I_{pks}F\frac{L_S I_{pks}}{V_S} \qquad (2)$$

Re-arrange equation (2), switching frequency F (1/T) of the primary switch 105 can be expressed as:

$$F = \frac{2V_S}{L_S I_{pks}^2}I_O \qquad (3)$$

As $I_{pkp}$, $V_S$, $N_{PS}$ and $L_S$ are a constant value in the traditional primary-side regulated PFM controller 100, the switching frequency F of the primary switch 105 is direct proportional to load output current $I_O$. Its frequency against output loading characteristic curve F1 is depicted in FIG. 8.

The advantage of using constant $I_{pkp}$ is its simplicity of circuit implementation for frequency reduction and cable compensation scheme which is in turns to have minimum die cost. However, it may have audible noise at light load condition while the switching frequency drops into 1~2 KHz frequency range which is the most sensitive frequency range for human ear. Another issue by using this scheme is the poor transient response from light to heavy load transition. This is because the switching frequency becomes too low (e.g. 500 Hz) at no load condition to response any sudden change of loading that incurs high output voltage dip.

SUMMARY OF THE INVENTION

The primary objective of the present invention is to provide a primary-side regulated PFM controller that not only can resolve the all the drawbacks mentioned in prior art PFM controller such as audible noise, poor transient response and voltage drop across output cable but also can keep the circuit implementation simple enough for meeting high conversion efficiency at light load condition. The new primary-side regulated PFM controller according to present invention adapts a novel primary side peak current and frequency reduction scheme.

According to one aspect, the present invention relates to a primary-side regulated PFM controller comprising a CS comparator, a PFM control module, a feedback error amplifier, a CV control module and a reference voltage generating module. In one embodiment, the CS comparator receives an input voltage from an emitter of the primary switch via a positive input and a peak current reference voltage via a negative input, and outputs a PFM control signal based on the input voltage and the peak current reference voltage via an output. In present embodiment, the PFM control module turns off the primary switch based on the PFM control signal. During the off time, the feedback error amplifier receives a primary-side sample voltage via a first input and an error reference voltage via a second input, and outputs an error amplifying signal via an output. In present embodiment, the CV control module is used for setting the primary switch off time. In present embodiment, the reference voltage generating module generates the peak current reference voltage and error reference voltage based on the primary-side sample voltage, a first reference voltage and a second reference voltage.

In one embodiment, the reference voltage generating module comprises a time detector, a peak current reference voltage generating unit and an error reference voltage generating unit. In present embodiment, the time detector is added to monitor the waveform of the primary-side sample voltage and then generate a duty cycle of a secondary rectifier. In present embodiment, the peak current reference voltage generating unit generates the peak current reference voltage based on the duty cycle of the secondary rectifier and the first reference voltage. In present embodiment, the error reference voltage generating unit generates the error reference voltage based on the peak current reference voltage, the duty cycle of the secondary rectifier and the second reference voltage.

Furthermore, the peak current reference voltage generating unit comprises a first switching capacitor filtering network, an operational amplifier, a second switching capacitor filtering network and a filtering resistor. In present embodiment, the first switching capacitor filtering network receives the first reference voltage via an input and grounded via a first output, and the second output of the first switching capacitor filtering network is coupled to the first input of the operational amplifier. The second input of the operational amplifier is grounded. In present embodiment, the first input of the operational amplifier is coupled to the input of the second switching capacitor filtering network, The first output of the second switching capacitor filtering network is grounded and the second output of the second switching capacitor filtering network is coupled to the output of the operational amplifier. The filtering resistor is coupled to the output of the operational amplifier and output the peak current reference voltage.

Additionally, the first switching capacitor filtering network comprises a first filtering capacitor, a first clock switch, a second clock switch, a third clock switch and a fourth clock switch. Wherein, the first terminal of the first filtering capacitor receivers the first reference voltage via the first clock switch, and grounds via the fourth clock switch, the second terminal of the first filtering capacitor is coupled to the first input of the operational amplifier via the second clock switch and grounded via the third clock switch. Additionally, the second switching capacitor filtering network comprises a second filtering capacitor, a third filtering capacitor, a fifth clock switch, a sixth clock switch, a seventh clock switch and a eighth clock switch. Wherein, the third filtering capacitor is coupled between the first input and the output of the operational amplifier. The first terminal of the second filtering capacitor is coupled to the first input of the operational amplifier via the fifth clock switch and grounded via the sixth clock switch. The second terminal of the second filtering capacitor is coupled to the output of the operational amplifier via the seventh clock switch and grounded via the eighth clock switch.

In present embodiment, the first and third clock switches are controlled by a first clock, the second and fourth clock switches are controlled by a second clock, the fifth and seventh clock switches are controlled by a third clock, and the sixth and eighth clock switches are controlled by a fourth clock. Wherein, the first clock is a nonoverlapping inverse clock of the second clock, the third clock is a nonoverlapping inverse clock of the fourth clock. The clocks are generated based on the duty cycle of the secondary rectifier.

In present embodiment, the error reference voltage generating unit comprises a first multiplier for generating a compensation voltage based on the peak current reference voltage and the duty cycle of the secondary rectifier, a second multiplier for generating a cable compensation voltage based on the compensation voltage and a cable compensation constant value and an adder for generating the error reference voltage based on the cable compensation voltage and the second reference voltage.

In another embodiment, the peak current reference voltage generating unit comprises a function generator for generating the peak current reference voltage based on the duty cycle of the secondary rectifier and the first reference voltage according to a specific transfer functions fun(D) defined as $$fun(D) = \frac{\beta}{1-D}.$$

In present embodiment, the error reference voltage generating unit comprises a subtracter for generating the cable compensation voltage based on the peak current reference voltage and first reference voltage and an adder for generating the error reference voltage based on the cable compensation voltage and the second reference voltage. Furthermore, the cable compensation voltage becomes $V_{CB}=\delta \times (V_{CS}-\beta \times V_{CSO})$.

In a further aspect, the present invention relates to a primary-side controlled PFM converter using the primary-side regulated PFM controller mentioned above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention, and wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

Figure 3:
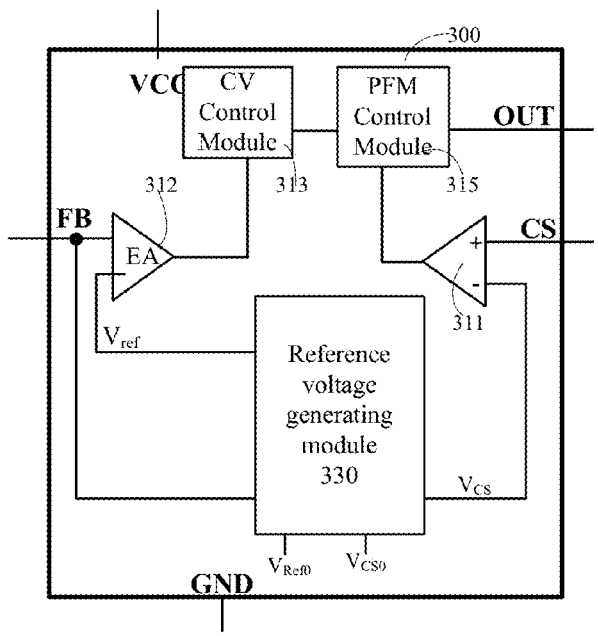
FIG. 3 shows a functional block diagram of the primary-side regulated PFM controller according to one embodiment of the present invention.

Referring now to FIG. 3, a primary-side regulated PFM controller is shown according to one embodiment of the present invention. The primary-side regulated PFM controller comprises a CS comparator 311, a feedback error amplifier 312, a constant voltage (CV) control module 313, PFM control module 315 and a reference voltage generating module 330. CS comparator 311 receives an input voltage from an emitter of the primary switch via a positive input and a peak current reference voltage $V_{CS}$ via a negative input, and outputs a PFM control signal based on the input voltage and the peak current reference voltage $V_{CS}$ via an output. The PFM control module 315 receives PFM control signal from the CS comparator 311 and turns off the primary switch based on the PFM control signal. During the off time, the feedback error amplifier 312 receives a primary-side sample voltage $V_{FB}$ via the first input and an error reference voltage Vref via a second input, and then outputs an error amplifying signal via an output. CV control module 313 receives the error amplifying signal from the feedback error amplifier 312, and sets the primary switch off time. The reference voltage generating module 330 generates the peak current reference voltage $V_{CS}$ and error reference voltage Vref based on the primary-side sample voltage $V_{FB}$, a first reference voltage and a second reference voltage.

One skilled in the art, CS comparator 311, PFM control module 315, feedback error amplifier 312 and CV control module 313 can be constructed by using any known module, circuit or device. Wherein, the first reference voltage and second reference voltage can be a preset peak current reference voltage $V_{CS0}$ and a preset error reference voltage Vref0. One skilled in the art are familiar with different methods for presetting the preset peak current reference voltage $V_{CS0}$ and a preset error reference voltage Vref0, and such methods are not described here for concision.

When implementing the primary-side regulated PFM controller according to present invention, the primary peak current reference voltage $V_{CS}$ and feedback reference voltage $V_{REF}$ is no longer a constant value but depend on output loading current $I_O$. Accordingly, the new primary-side regulated PFM controller adapts a novel primary side peak current and frequency reduction scheme, and not only can resolve the all the drawbacks mentioned in prior art PFM controller such as audible noise, poor transient response and voltage drop across output cable but also can keep the circuit implementation simple enough for meeting high conversion efficiency at light load condition.

Figure 4:
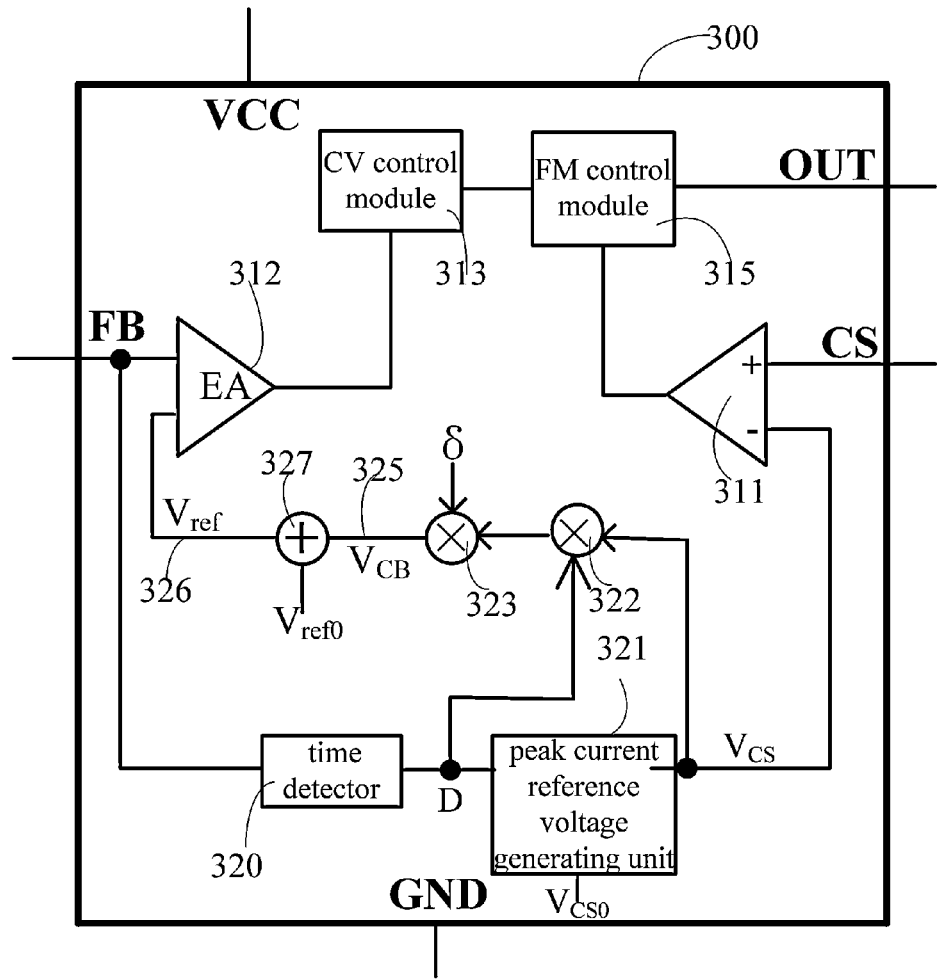
FIG. 4 shows a functional block diagram of the primary-side regulated PFM controller according to another embodiment of the present invention.

Referring now to FIG. 4, another primary-side regulated PFM controller is shown according to one embodiment of the present invention. The primary-side regulated PFM controller 300 comprises CS comparator 311, feedback error amplifier 312, CV control module 313, PFM control module 315 and reference voltage generating module (unshown). In present embodiment, the functions and constructions of the CS comparator 311, feedback error amplifier 312, CV control module 313, PFM control module 315 are similar as those in FIG. 3, and not described for concision.

Now, the reference voltage generating module is explained in detail as follows. As shown in FIG. 4, the reference voltage generating module consists of time detector 320, peak current reference voltage generating unit 321 and an error reference voltage generating unit comprising multiplier 322, multiplier 323 and adder 327. In present embodiment, the time detector 320 is added to monitor the waveform of the primary-side sample voltage $V_{FB}$ and then generate a duty cycle of a secondary rectifier. In present embodiment, the peak current reference voltage generating unit 321 generates the peak current reference voltage $V_{CS}$ based on the duty cycle of the secondary rectifier D1 and primary peak current reference voltage $V_{CS}$. The multiplier 322 generates a compensation voltage based on the peak current reference voltage $V_{CS}$ and the duty cycle of the secondary rectifier. The multiplier 322 generates a cable compensation voltage based on the compensation voltage and a cable compensation constant value. The adder 327 adds the cable compensation constant value and the preset error reference voltage Vref0 up to generate the error reference voltage Vref.

Figure 1A:
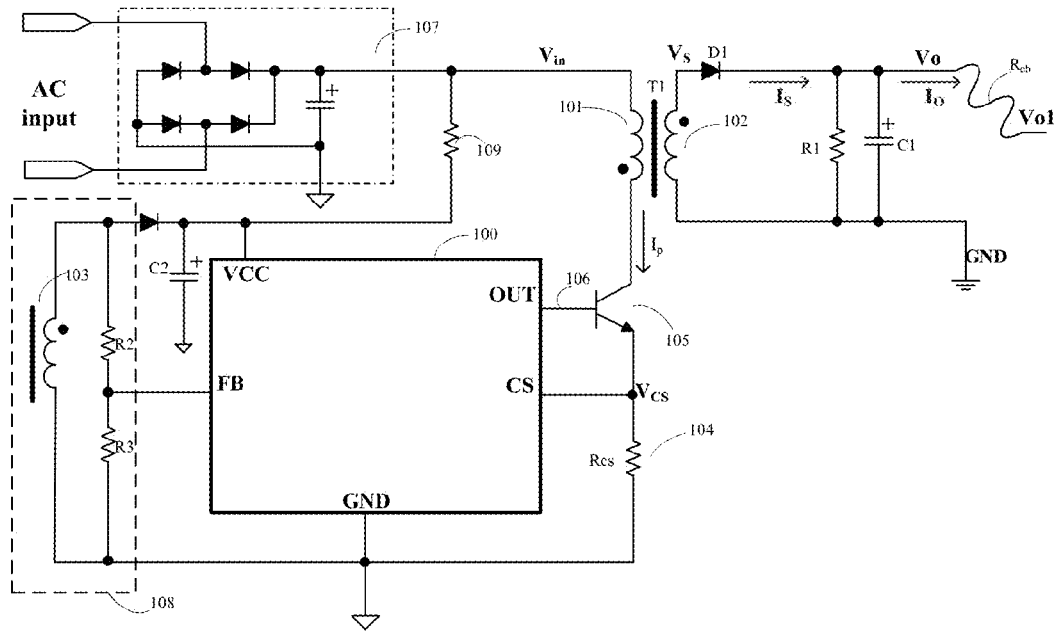
FIG. 1A shows a block diagram of an exemplary prior-art primary-side controlled PFM converter.
Figure 1B:
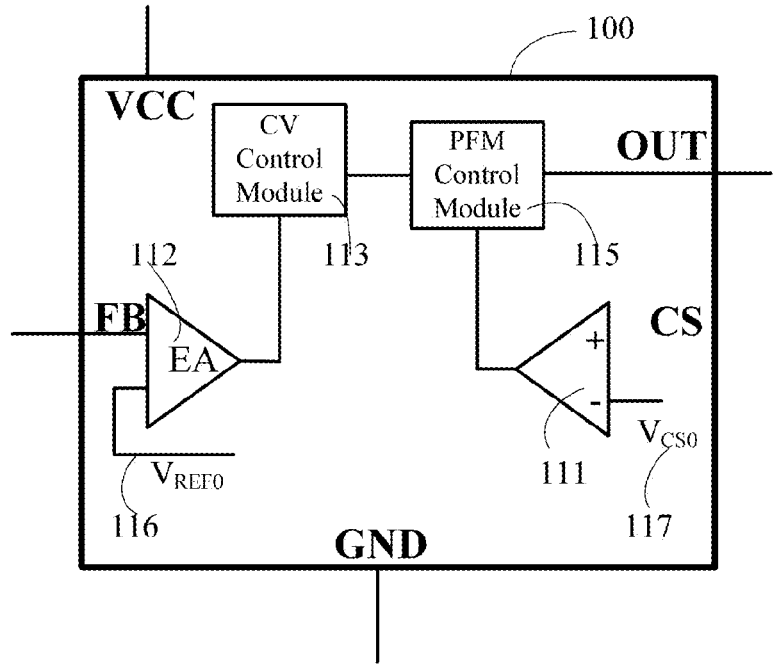
FIG. 1B shows a functional block diagram of an exemplary prior-art primary-side regulated PFM controller.
Figure 2:
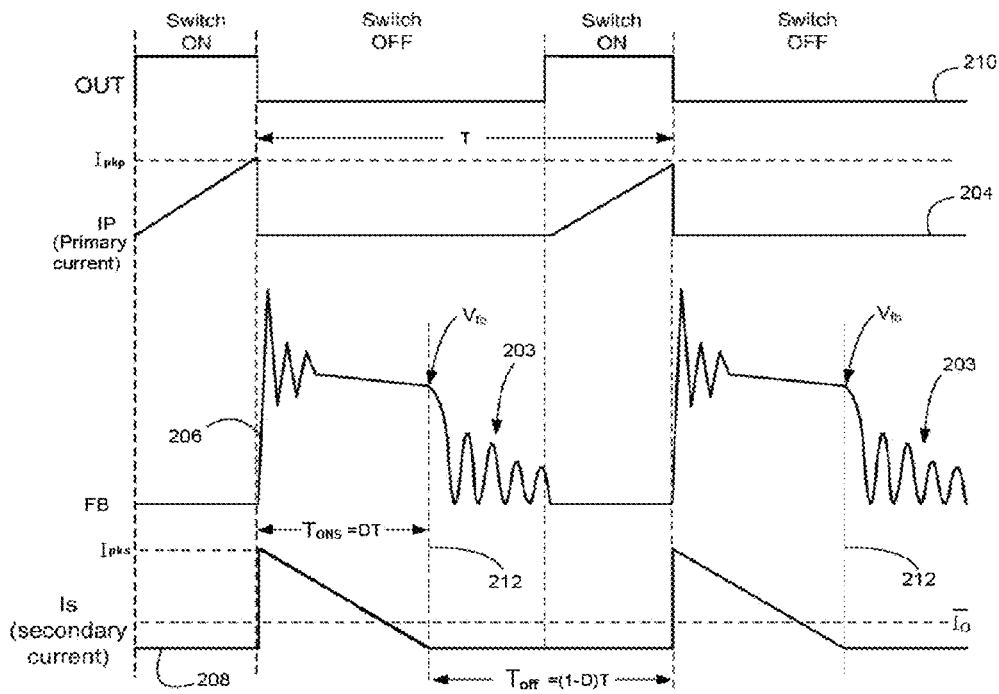
FIG. 2 shows waveforms observed from "OUT" node, "CS" node, FB node and secondary side current Is in the prior-art primary-side controlled PFM converter of FIG. 1.
Figure 10:
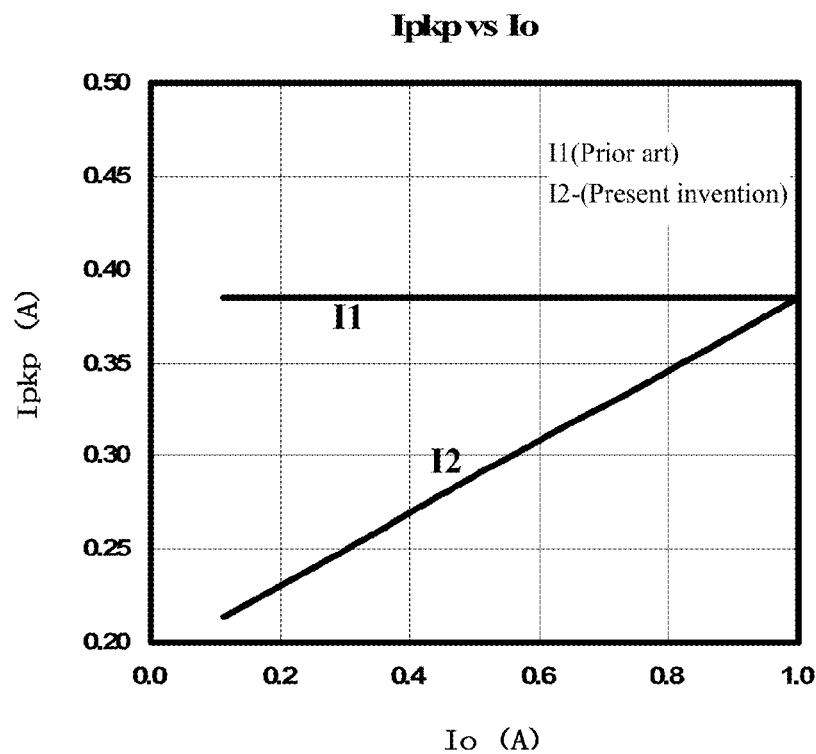
FIG. 10 compares the Primary-side Peak current vs Output loading current IO characteristic in the primary-side regulated PFM controller according to the prior art and present invention.
Figure 11:
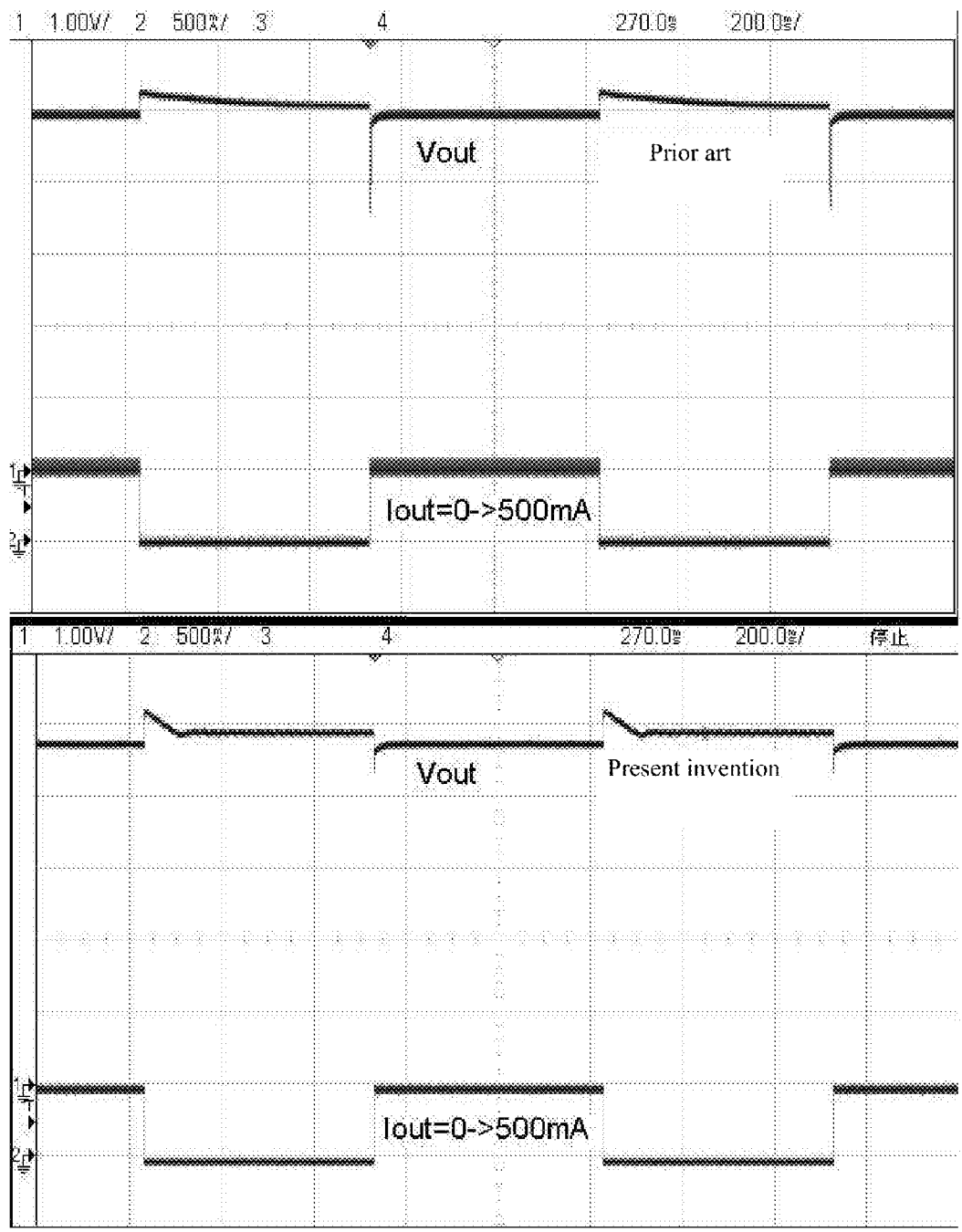
FIG. 11 compares the transient responses in the primary-side regulated PFM controller according to the prior art and present invention.

In present embodiment, the primary side cycle by cycle switch peak current $I_{pkp}$ is no longer a constant but depends on the duty cycle D ($T_{ons}/T$) of the secondary rectifier D1 forward bias current shown in FIG. 2. Referring to the present invention primary-side regulated PFM controller 300 depicted in FIG. 4, the time detector 320 is added to monitor the waveform of $V_{FB}$ 206 and then generate the duty cycle D value which becomes one of inputs of Peak current reference voltage generating unit 321 in the primary-side regulated PFM controller 300. An instantaneous switch peak current $I_{pkp}$ (or $V_{cs}/R_{cs}$) value is derived from a predefined transfer function in Peak current reference voltage generating unit 321 based on the input of the instantaneous value of D and the preset peak current reference voltage $V_{CS0}$. The transfer function should be selected to satisfy the relationship of switching frequency F and switch peak current $I_{pkp}$ against with output loading current $I_o$ which are defined in curve F2 (FIG. 9) and I2 (FIG. 10) respectively. Comparing with the curve F1 and I1 which are the frequency and peak current characteristic of the traditional primary-side regulated PFM controller 100, the new design shows higher switching frequency but lower value of switch peak current $I_{pkp}$ at light load condition. This resolves the audible noise and poor transient response issue from the prior art PFM controller. FIG. 11 compares the transient responses in the primary-side regulated PFM controller according to the prior art and present invention.

Furthermore, according to the present invention, voltage regulation error due to the voltage drop across output cable can be resolved by properly setting cable compensation voltage $V_{CB}$ which is added to a constant reference value $V_{ref0}$ to compensate the voltage drop across output cable. $V_{CB}$ is defined as:

$$V_{CB} = \delta \times D \times V_{CS} \tag{4}$$

Where $D=T_{ons}/T$ and $\delta$ is the cable compensation constant. The voltage regulation error due to loading variation can be eliminated by properly selecting the cable compensation constant value $\delta$ to accurately offset the voltage drop across the cable.

Figure 5:
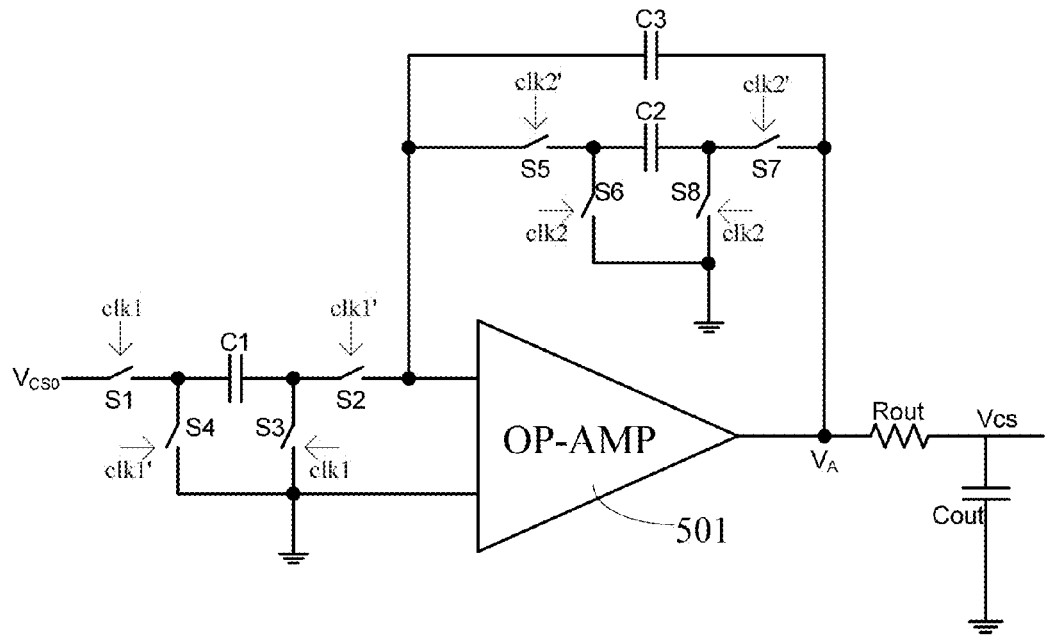
FIG. 5 shows a functional block diagram of the peak current reference voltage generating unit according to one embodiment of the present invention.
Figure 6:
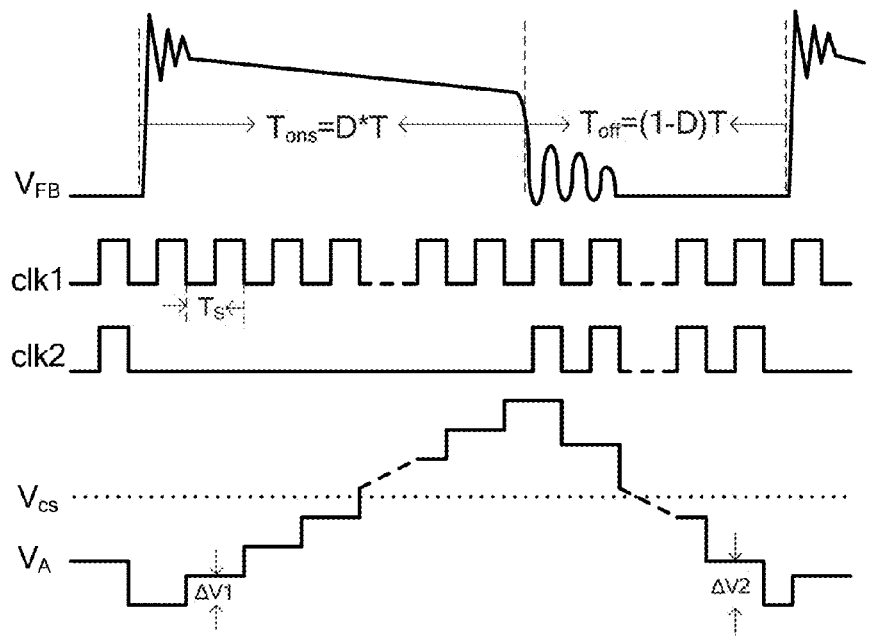
FIG. 6 shows the operational waveforms of the peak current reference voltage generating unit in FIG. 5.

Referring now to FIG. 5, a functional block diagram of the peak current reference voltage generating unit according to one embodiment of the present invention is shown. FIG. 6 shows the operational waveforms of the peak current reference voltage generating unit in FIG. 5.

As shown in FIG. 5, the peak current reference voltage generating unit comprises a first switching capacitor filtering network, an operational amplifier 501, a second switching capacitor filtering network and a filtering resistor Rout. In present embodiment, the first switching capacitor filtering network receives the preset peak current reference voltage $V_{CS0}$ via an input and grounded via a first output, and the second output of the first switching capacitor filtering network is coupled to the first input of the operational amplifier 501. The second input of the operational amplifier 501 is grounded. In present embodiment, the first input of the operational amplifier 501 is coupled to the input of the second switching capacitor filtering network, The first output of the second switching capacitor filtering network is grounded and the second output of the second switching capacitor filtering network is coupled to the output of the operational amplifier 501. The filtering resistor is coupled to the output of the operational amplifier 501 and output the peak current reference voltage $V_{CS}$.

Referring to FIG. 5 again, the first switching capacitor filtering network comprises a filtering capacitor C1, a first clock switch S1, a second clock switch S2, a third clock switch S3 and a fourth clock switch S4. The second switching capacitor filtering network comprises a filtering capacitor C2, a filtering capacitor C3, a fifth clock switch S5, a sixth clock switch S6, a seventh clock switch S7 and a eighth clock switch S8. Wherein, the first terminal of the filtering capacitor C1 receivers the preset peak current reference voltage $V_{CS0}$ via the first clock switch S1, and grounds via the fourth clock switch S4. The second terminal of the filtering capacitor C1 is coupled to the first input of the operational amplifier 501 via the second clock switch s2 and grounded via the third clock switch S3. Wherein, the filtering capacitor C3 is coupled between the first input and the output of the operational amplifier 501. The first terminal of the filtering capacitor C2 is coupled to the first input of the operational amplifier 501 via the fifth clock switch S5 and grounded via the sixth clock switch S6. The second terminal of the filtering capacitor C2 is coupled to the output of the operational amplifier 501 via the seventh clock switch S7 and grounded via the eighth clock switch S8.

In present embodiment, the first and third clock switches S1 and S3 are controlled by a first clock, the second and fourth clock switches S2 and S4 are controlled by a second clock, the fifth and seventh clock switches S5 and S7 are controlled by a third clock, and the sixth and eighth clock switches S6 and S8 are controlled by a fourth clock. Wherein, the first clock is a nonoverlapping inverse clock of the second clock, the third clock is a nonoverlapping inverse clock of the fourth clock. The clocks are generated based on the duty cycle of the secondary rectifier.

One skilled in the art knows that, the embodiment disclosed in FIG. 5 is only for illumination, and other peak current reference voltage generating unit can be obtained according to the teaching of present invention.

Figure 7:
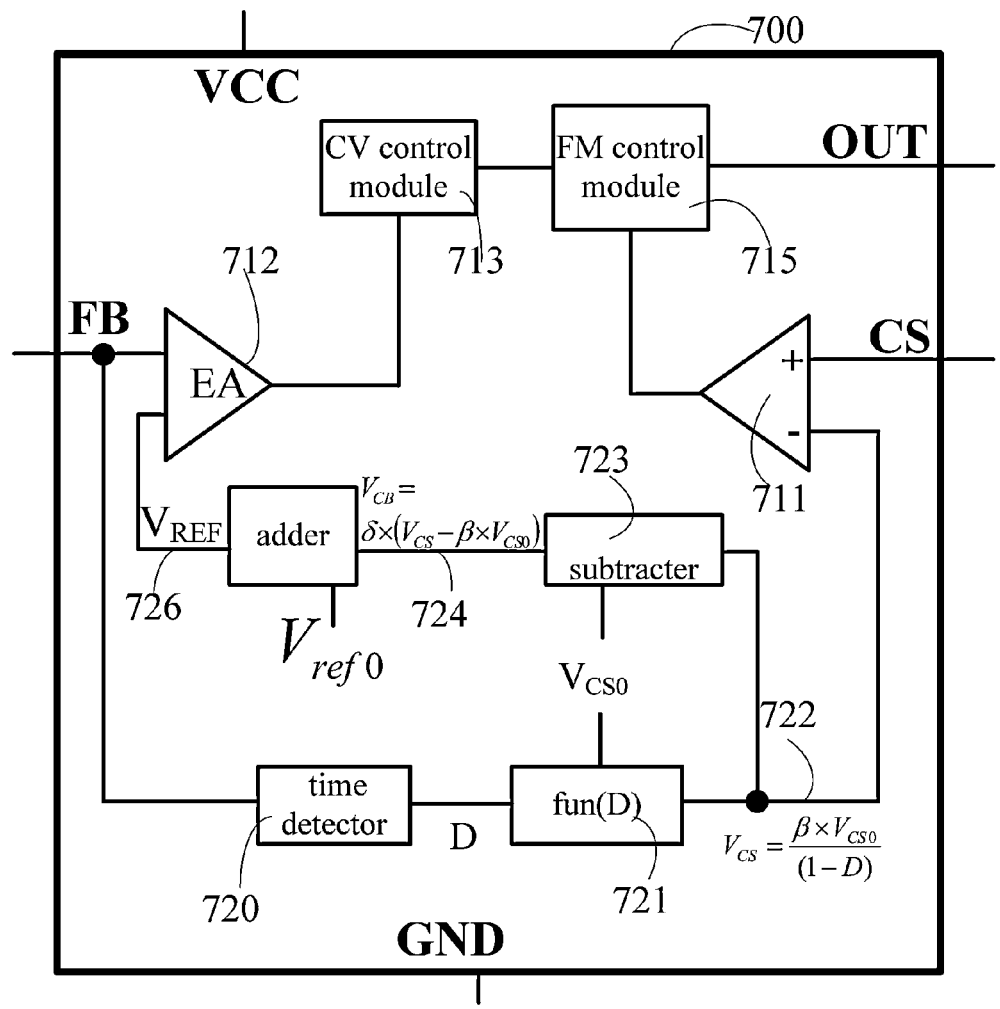
FIG. 7 shows a functional block diagram of the peak current reference voltage generating unit according to another embodiment of the present invention.

Referring now to FIG. 7, a functional block diagram of the peak current reference voltage generating unit 700 according to another embodiment of the present invention is shown. The peak current reference voltage generating unit 700 comprises CS comparator 711, PFM control module 715, FB error amplifier 712, CV control module 713, and reference voltage generating module. In present embodiment, the functions and constructions of the CS comparator 711, feedback error amplifier 712, CV control module 713, PFM control module 715 are similar as those in FIG. 3, and not described for concision. Now, the reference voltage generating module is explained in detail as follows. As shown in FIG. 7, reference voltage generating module comprises time detector 720, a peak current reference voltage generating unit and an error reference voltage generating unit. In present embodiment, the peak current reference voltage generating unit is a function generator 721 which is used for generating the peak current reference voltage $V_{CS}$ based on the duty cycle of the secondary rectifier and the preset peak current reference voltage $V_{CS0}$ according to a specific transfer functions fun(D). One of preferred transfer functions fun(D) is defined as $$fun(D) = \frac{\beta}{1-D}.$$

Such transfer functions fun(D) enables relationship between switching frequency F and output loading current $I_o$ satisfy that $$F = \frac{2V_S}{L_S I_{pks}^2} I_O = \frac{2V_S I_O}{L_S N_{PS}^2 I_{pkp}^2} = \frac{2V_S I_O}{L_S N_{PS}^2 \left(\frac{\beta V_{CS0}}{R_{CS}} + \frac{2I_O}{N_{PS}}\right)^2},$$

and switch peak current $$I_{pkp} = \frac{V_{CS}}{R_{CS}} = \frac{V_{CS0}}{R_{CS}} \times \frac{\beta}{(1-D)}.$$

By selecting the appropriated value of $\beta$, $V_{CS0}$, $R_{CS}$, $N_{PS}$, $V_S$ and $L_S$, the relationship between switching frequency F and output loading current $I_o$ can fit the curve F2 seamlessly.

In present embodiment, the error reference voltage generating unit comprises a subtracter 723 for generating the cable compensation voltage $V_{CB}$ based on the peak current reference voltage $V_{CS}$ and preset peak current reference voltage $V_{CS0}$ and an adder 726 for generating the error reference voltage based on the cable compensation voltage $V_{CB}$ and the preset error reference voltage Vref0.

When implementing the primary-side regulated PFM controller according to present invention, the circuit implementation is kept as simple as possible to minimize the silicon die cost. The exemplary preferred transfer function fun(D) used in the functional block "function generator 721 is provided to show how simple of an one stage switching capacitor circuit can be used to implement a such peak current and frequency reduction scheme defined in FIGS. 8 and 9. Using this transfer function, the circuit implementation of the cable compensation scheme can be further simplified to a simple adder rather than a relatively complicated multiplier required in equation (4).

Figure 8:
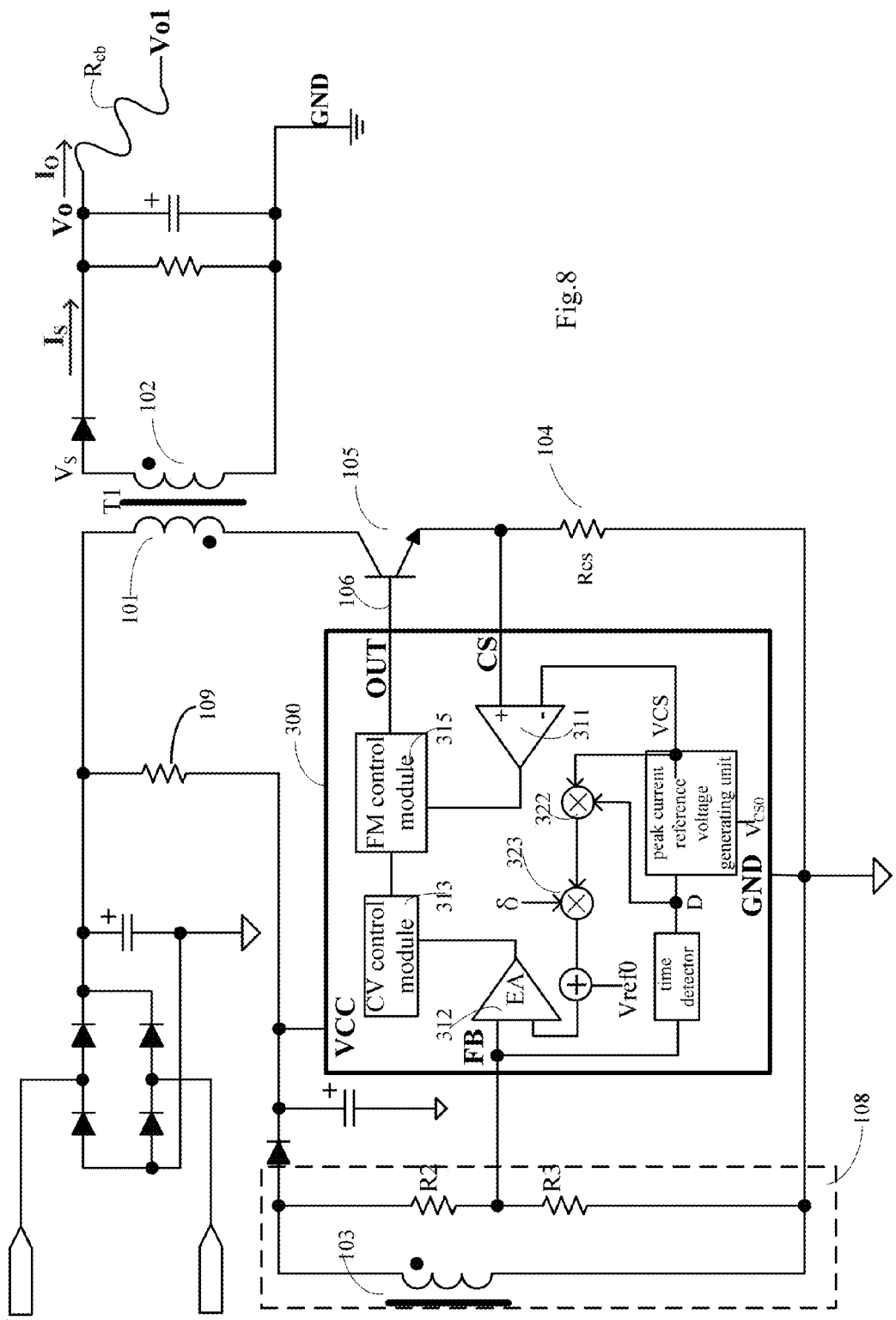
FIG. 8 shows a functional block diagram of a primary-side controlled PFM converter according to one embodiment of the present invention.

FIG. 8 shows a functional block diagram of a primary-side controlled PFM converter according to one embodiment of the present invention. One skilled in the art knows that, any primary-side regulated PFM controller mentioned in FIG. 3-8 can be used in the primary-side controlled PFM converter shown in FIG. 8. Now, the operation principle of the primary-side controlled PFM converter and the primary-side regulated PFM controller mentioned in FIGS. 4, 5, 7 and 8 are illustrated as follows.

In the primary-side regulated PFM controller mentioned in FIGS. 4, 5 and 7, the operation principle is same as primary-side regulated PFM controller 100 except the primary peak current reference voltage $V_{CS}$ and feedback reference voltage $V_{REF}$ is no longer a constant value but depend on output loading current $I_O$. The peak current reference voltage $V_{CS}$ decreases but $V_{REF}$ increases as the output loading current $I_O$ decreases.

As shown in FIG. 4, the timing detector 320 is added to extract the secondary side on/off timing information through primary-side sample voltage $V_{FB}$. The secondary side turn-on duty cycle D is expressed by the following equation (5):

$$D = \frac{T_{ONS}}{T} \qquad (5)$$

By considering the waveform of $I_S$ at FIG. 2, $I_O$ can be expressed as $$I_O = \frac{1}{2} \times I_{pks} D = \frac{1}{2} \times I_{pkp} \times N_{PS} \times D \qquad (6)$$

Equation (6) shows that output loading current $I_O$ is direct proportion to duty cycle D. Primary peak current reference voltage $V_{cs}$ can be related to output loading current $I_O$ based on a transfer function fun(D) which is function of duty cycle D. Consider the primary-side regulated PFM controller in FIG. 3, $V_{cs}$ is expressed as:

$$V_{CS} = V_{CS0} \times \text{fun}(D) \qquad (7)$$

One of preferred transfer functions fun(D) is defined in equation (8):

$$\text{fun}(D) = \frac{\beta}{1-D} \qquad (8)$$

Using Equation (7) & (8), switch peak current $I_{pkp}$ can be expressed as following:

$$I_{pkp} = \frac{V_{CS}}{R_{CS}} = \frac{V_{CS0}}{R_{CS}} \times \frac{\beta}{(1-D)} \qquad (9)$$

Combine equation (8) & (9) by eliminating the duty cycle D, we have:

$$I_{pkp} = \frac{\beta V_{CS0}}{R_{CS}} + \frac{2I_O}{N_{PS}} \qquad (10)$$

Equation (10) shows that switch peak current $I_{pkp}$ increases as the loading current $I_o$ increases which can fit the curve I2 characteristic by selecting an appropriated value of $\beta$, $V_{CS0}$, $R_{CS}$, $N_{PS}$. It satisfies one of design goals which are switch peak current decrease with loading current decrease.

Figure 9:
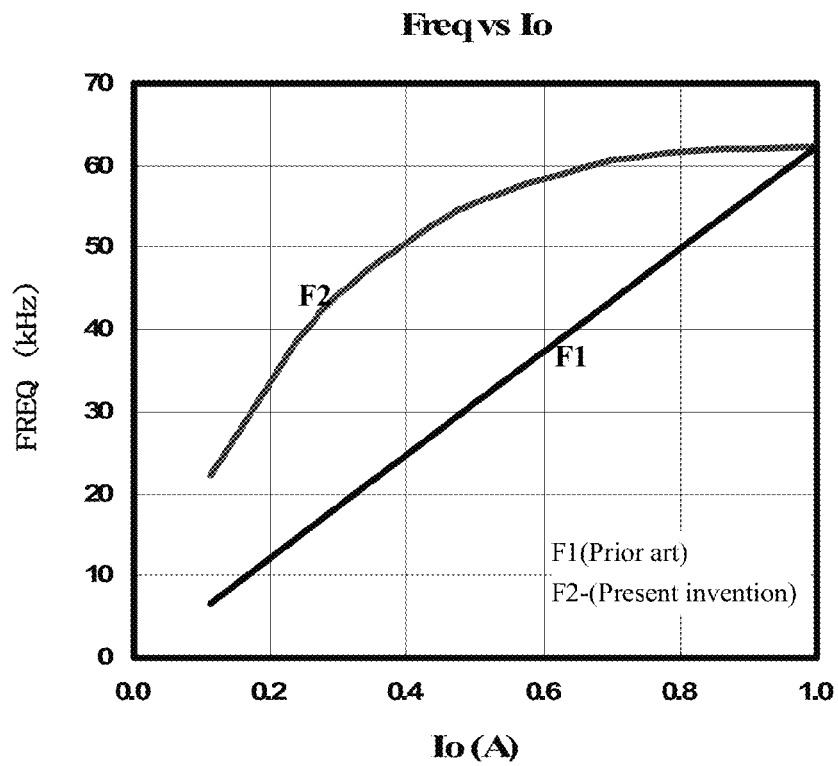
FIG. 9 compares the Frequency vs Output loading current IO characteristic in the primary-side regulated PFM controller according to the prior art and present invention.

In order to meet another design goal which is defined in curve F2 in FIG. 9, result of equation (3) combining with equation 10 is applied. We have equation 11 shown below:

$$F = \frac{2V_S}{L_S I_{pks}^2} I_O = \frac{2V_S I_O}{L_S N_{PS}^2 I_{pkp}^2} = \frac{2V_S I_O}{L_S N_{PS}^2 \left(\frac{\beta V_{CS0}}{R_{CS}} + \frac{2I_O}{N_{PS}}\right)^2} \qquad (11)$$

Wherein, $V_{CS0}$ refers to the first reference voltage, $R_{CS}$ refers to an input resistance of the primary switch, D refers to the duty cycle of a secondary rectifier, $\beta$ refers to an adjustable coefficient, Vs refers to an secondary voltage of an transformer, Ls refers to an output inductance of the transformer, Io refers to output loading current, and Nps refers to a primary to secondary winding ratio. By selecting the appropriated value of $\beta$, $V_{CS0}$, $R_{CS}$, $N_{PS}$, $V_S$ and $L_S$, equation (11) can fit the curve F2 seamlessly.

The reason for using fun(D) defined in equation (8) is not only it can meet the requirements of peak current and frequency reduction scheme but also its simplicity of circuit implementation. It can be implemented by a simple one stage stray insensitive switching capacitor filter shown in FIG. 5. Its operation principle is described by the waveforms in FIG. 6. Capacitor C1 controlled by clock clk1 and clk1' is used to charge C3 in each clk1 cycle. Capacitor C2 controlled by clock clk2 and clk2' is used to discharge C3 in each clk2 cycle. clk1 and clk2 is running at much higher clock frequency compared with switching frequency F. clk1 is kept running all the time but clk2 is only up running during Toffs period. Assume N is the number of clk1 cycle period $T_S$ that is equal to one system switching period T, the total charge Q1 being transferred to C3 in one system switching period T is:

$$Q_1 = NC_1 V_{ref1} \qquad (12)$$

As clk2 is only up running during Toffs period, the total number of clk2 clock in one system switching period is N*(1−D) where D is duty cycle D ($T_{ons}$/T) of the secondary rectifier D1. The total charge Q2 being discharged from C3 in one switching period T is approximated by:

$$Q_2 \approx N(1-D)C_2 V_{CS} \qquad (13)$$

where $V_{CS}$ is the average node voltage $V_A$ at equilibrium state.

At equilibrium state, total charge Q1 should be equal to total charge Q2 and we have:

$$NC_1V_{ref1}=N(1-D)C_2V_{CS} \quad (14)$$

Rearrange equation (14), $V_{CS}$ can be expressed as:

$$V_{CS} = V_{ref1}\frac{C_1}{C_2(1-D)} \quad (15)$$

Equation (6) can be realized by setting $V_{ref1}=V_{CS0}$ and $C1/C2=\beta$.

So far, we have discussed how the peak current and frequency reduction scheme can be implemented with a simple switched capacitor circuit. Now, we will discuss why the cable compensation can be realized based on equation (4). In addition, it will be shown that the implementation of cable compensation scheme can be further simplified if fun(D) defined in equation (7) is applied.

As the voltage drop across the DC cable 109 with cable resistance $R_{cb}$ is $I_O*R_{cb}$, an appropriated delta value $\delta*I_O$ should be added to the preset error reference voltage Vref0 in order to maintain a constant output voltage at $V_{O1}$. Consider FIG. 6, $V_{O1}$ can be expressed as following equation:

$$V_{O1}=V_S-V_{D1}-I_OR_{cb}=A(V_{ref0}+\delta\times D\times V_{CS})-V_{D1}-I_OR_{cb} \quad (16)$$

where A is the feedback loop gain formed by secondary to auxiliary winding ratio $N_{SA}$ and potential divider network R2 and R3:

$$A = \frac{N_{SA}\times(R_2+R_3)}{R_3} \quad (17)$$

In order to cancel out the voltage drop across the cable, then we should set:

$$A(\delta\times D\Delta V_{CS})=I_OR_{cb} \quad (18)$$

Substitute equation (8) into (18), we have:

$$A(\delta\times D\times V_{CS}) = \frac{I_{pks}DR_{cb}}{2} = \frac{N_{PS}V_{CS}/R_{CS}(DR_{cb})}{2} \quad (19)$$

Re-arrange equation (19), the delta value $\delta$ can be expressed as:

$$\delta = \frac{N_{PS}R_{cb}}{2AR_{CS}} \quad (20)$$

Therefore, cable compensation can simply implemented with equation (4) by setting delta value $\delta$ defined in equation (20). However, this equation requires a relatively complicated multiplier to process two input variable duty cycle of the secondary rectifier D1 and peak current reference voltage $V_{CS}$. Using fun(D) defined in equation (8), cable compensation function can be further simplified to a subtractor.

Equation (4) can be rewritten as:

$$V_{CB}=\delta\times(C_{CS}-(1-D)\times V_{CS}) \quad (21)$$

Using equation (7), then $V_{CB}$ becomes:

$$V_{CB}=\delta\times(V_{CS}-\beta\times V_{CS0}) \quad (22)$$

Equation (22) includes only one input variable $V_{CS}$ which can be simply implemented with a sub-tractor instead of complicated multiplier that is required in equation (4), and the specific circuit may refer to FIG. 7 and its description.

When implementing the primary-side regulated PFM controller and the primary-side controlled PFM converter according to present invention, the primary peak current reference voltage $V_{CS}$ and feedback reference voltage $V_{REF}$ is no longer a constant value but depend on output loading current $I_O$. Accordingly, the new primary-side regulated PFM controller adapts a novel primary side peak current and frequency reduction scheme, and not only can resolve the all the drawbacks mentioned in prior art PFM controller such as audible noise, poor transient response and voltage drop across output cable but also can keep the circuit implementation simple enough for meeting high conversion efficiency at light load condition.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What claimed is:

1. A primary-side regulated PFM controller comprising:
    a CS comparator for receiving an input voltage from an emitter of a primary switch via a positive input and a peak current reference voltage via a negative input, and outputting a PFM control signal based on the input voltage and the peak current reference voltage via an output;
    a PFM control module for turning off the primary switch based on the PFM control signal;
    a feedback error amplifier for receiving a primary-side sample voltage via a first input and an error reference voltage via a second input, and outputting an error amplifying signal via an output, during an off time of the primary switch;
    a CV control module, setting the off time of the primary switch based on the error amplifying signal;
    and a reference voltage generating module for generating the peak current reference voltage and the error reference voltage based on the primary-side sample voltage, a first reference voltage and a second reference voltage.

2. The primary-side regulated PFM controller according to claim 1, wherein, the reference voltage generating module comprises:
    a time detector for monitoring a waveform of the primary-side sample voltage and then generating a duty cycle of a secondary rectifier;
    a peak current reference voltage generating unit for generating the peak current reference voltage based on the duty cycle of the secondary rectifier and the first reference voltage;
    and an error reference voltage generating unit for generating the error reference voltage based on the peak current reference voltage, the duty cycle of the secondary rectifier and the second reference voltage.

3. The primary-side regulated PFM controller according to claim 2, wherein, the peak current reference voltage generating unit comprises:

a first switching capacitor filtering network for receiving the first reference voltage via an input and being grounded via a first output;

an operational amplifier with a first input coupled to a second output of the first switching capacitor filtering network and a second input grounded;

a second switching capacitor filtering network with an input coupled to the first input of the first switching capacitor filtering network, a first output grounded, and a second output coupled to the output of the operational amplifier;

and a filtering resistor coupled to the output of the operational amplifier and output the peak current reference voltage.

4. The primary-side regulated PFM controller according to claim 3, wherein, the first switching capacitor filtering network comprises a first filtering capacitor, a first clock switch, a second clock switch, a third clock switch and a fourth clock switch, wherein, the first terminal of the first filtering capacitor receivers the first reference voltage via the first clock switch, and grounds via the fourth clock switch, the second terminal of the first filtering capacitor is coupled to the first input of the operational amplifier via the second clock switch and grounded via the third clock switch.

5. The primary-side regulated PFM controller according to claim 4, wherein, the first and third clock switches are controlled by a first clock, the second and fourth clock switches are controlled by a second clock.

6. The primary-side regulated PFM controller according to claim 5, wherein, the first clock is a nonoverlapping inverse clock of the second clock.

7. The primary-side regulated PFM controller according to claim 4, wherein, the second switching capacitor filtering network comprises a second filtering capacitor, a third filtering capacitor, a fifth clock switch, a sixth clock switch, a seventh clock switch and a eighth clock switch, wherein, the third filtering capacitor is coupled between the first input and the output of the operational amplifier, the first terminal of the second filtering capacitor is coupled to the first input of the operational amplifier via the fifth clock switch and grounded via the sixth clock switch, the second terminal of the second filtering capacitor is coupled to the output of the operational amplifier via the seventh clock switch and grounded via the eighth clock switch.

8. The primary-side regulated PFM controller according to claim 7, wherein, the fifth and seventh clock switches are controlled by a third clock, and the sixth and eighth clock switches are controlled by a fourth clock.

9. The primary-side regulated PFM controller according to claim 8, wherein, the third clock is a nonoverlapping inverse clock of the fourth clock.

10. The primary-side regulated PFM controller according to claim 9, wherein, the third clock and fourth clock are generated based on the duty cycle of the secondary rectifier.

11. The primary-side regulated PFM controller according to claim 3, wherein, the error reference voltage generating unit comprises:

a first multiplier for generating a compensation voltage based on the peak current reference voltage and the duty cycle of the secondary rectifier;

a second multiplier for generating a cable compensation voltage based on the compensation voltage and a cable compensation constant value;

and an adder for generating the error reference voltage based on the cable compensation voltage and the second reference voltage.

12. The primary-side regulated PFM controller according to claim 2, wherein, the peak current reference voltage generating unit comprises a function generator for generating the peak current reference voltage based on the duty cycle of the secondary rectifier and the first reference voltage according to a specific transfer functions fun(D) defined as $$fun(D) = \frac{\beta}{1-D}.$$

13. The primary-side regulated PFM controller according to claim 12, wherein, the transfer functions fun(D) enables relationship between switching frequency F and output loading current $I_o$ satisfy that $$F = \frac{2V_S}{L_S I_{pks}^2} I_O = \frac{2V_S I_O}{L_S N_{PS}^2 I_{pkp}^2} = \frac{2V_S I_O}{L_S N_{PS}^2 \left(\frac{\beta V_{CS0}}{R_{CS}} + \frac{2I_O}{N_{PS}}\right)},$$

and switch peak current $$I_{pkp} = \frac{V_{CS}}{R_{CS}} = \frac{V_{CS0}}{R_{CS}} \times \frac{\beta}{(1-D)},$$

wherein, $V_{CS0}$ refers to the first reference voltage, $R_{CS}$ refers to an input resistance of the primary switch, D refers to the duty cycle of a secondary rectifier, $\beta$ refers to an adjustable coefficient, Vs refers to an secondary voltage of an transformer, Ls refers to an output inductance of the transformer, Io refers to output loading current, and Nps refers to a primary to secondary winding ratio.

14. The primary-side regulated PFM controller according to claim 12, wherein, the error reference voltage generating unit comprises:

a subtracter for generating the cable compensation voltage based on the peak current reference voltage and first reference voltage;

and an adder for generating the error reference voltage based on the cable compensation voltage and the second reference voltage.

15. The primary-side regulated PFM controller according to claim 12, wherein, the cable compensation voltage becomes $V_{CB}=\delta\times(V_{CS}-\beta\times V_{CS0})$, wherein, $V_{CB}$ refers to the cable compensation voltage, $V_{CS}$ refers to the peak current reference voltage, $\beta$ refers to an adjustable coefficient, $V_{CS0}$ refers to the first reference voltage and $\delta$ refers to the cable compensation constant value.

16. A primary-side controlled PFM converter comprising a primary-side regulated PFM controller, wherein, the primary-side regulated PFM controller comprising:

a CS comparator for receiving an input voltage from an emitter of a primary switch via a positive input and a peak current reference voltage via a negative input, and outputting a PFM control signal based on the input voltage and the peak current reference voltage via an output;

a PFM control module for turning off the primary switch based on the PFM control signal;

a feedback error amplifier for receiving a primary-side sample voltage via a first input and an error reference voltage via a second input, and outputting an error amplifying signal via an output, during an off time of the primary switch;

a CV control module, setting the off time of the primary switch based on the error amplifying signal;

and a reference voltage generating module for generating the peak current reference voltage and the error reference voltage based on the primary-side sample voltage, a first reference voltage and a second reference voltage.

17. The primary-side controlled PFM converter according to claim 16, wherein, the reference voltage generating module comprises:

a time detector for monitoring a waveform of the primary-side sample voltage and then generating a duty cycle of a secondary rectifier;

a peak current reference voltage generating unit for generating the peak current reference voltage based on the duty cycle of the secondary rectifier and the first reference voltage;

and an error reference voltage generating unit for generating the error reference voltage based on the peak current reference voltage, the duty cycle of the secondary rectifier and the second reference voltage.

18. The primary-side controlled PFM converter according to claim 17, wherein, the peak current reference voltage generating unit comprises:

a first switching capacitor filtering network for receiving the first reference voltage via an input and being grounded via a first output;

an operational amplifier with a first input coupled to a second output of the first switching capacitor filtering network and a second input grounded;

a second switching capacitor filtering network with an input coupled to the first input of the first switching capacitor filtering network, a first output grounded, and a second output coupled to the output of the operational amplifier;

and a filtering resistor coupled to the output of the operational amplifier and output the peak current reference voltage.

19. The primary-side controlled PFM converter according to claim 18, wherein, the first switching capacitor filtering network comprises a first filtering capacitor, a first clock switch, a second clock switch, a third clock switch and a fourth clock switch, wherein, the first terminal of the first filtering capacitor receivers the first reference voltage via the first clock switch, and grounds via the fourth clock switch, the second terminal of the first filtering capacitor is coupled to the first input of the operational amplifier via the second clock switch and grounded via the third clock switch.

20. The primary-side controlled PFM converter according to claim 19, wherein, the second switching capacitor filtering network comprises a second filtering capacitor, a third filtering capacitor, a fifth clock switch, a sixth clock switch, a seventh clock switch and a eighth clock switch, wherein, the third filtering capacitor is coupled between the first input and the output of the operational amplifier, the first terminal of the second filtering capacitor is coupled to the first input of the operational amplifier via the fifth clock switch and grounded via the sixth clock switch, the second terminal of the second filtering capacitor is coupled to the output of the operational amplifier via the seventh clock switch and grounded via the eighth clock switch.

* * * * *